United States Patent [19]

Kajimura

[11] Patent Number: 5,408,094
[45] Date of Patent: Apr. 18, 1995

[54] ATOMIC FORCE MICROSCOPE WITH LIGHT BEAM EMISSION AT PREDETERMINED ANGLE

[75] Inventor: Hiroshi Kajimura, Tokyo, Japan

[73] Assignee: Olympus Optical Co., Ltd., Tokyo, Japan

[21] Appl. No.: 57,336

[22] Filed: May 4, 1993

[30] Foreign Application Priority Data

May 7, 1992 [JP] Japan .................................. 4-114924
Mar. 31, 1993 [JP] Japan .................................. 5-073560

[51] Int. Cl.$^6$ ............................................. H01J 37/26
[52] U.S. Cl. .................................... 250/234; 250/306; 250/561
[58] Field of Search ............... 250/234, 560, 561, 306, 250/307, 310, 311; 73/105, 862.625

[56] References Cited

U.S. PATENT DOCUMENTS

| | | | |
|---|---|---|---|
| 5,025,658 | 6/1991 | Elings et al. | 73/105 |
| 5,157,251 | 10/1992 | Albrecht et al. | 250/216 |
| 5,166,516 | 11/1992 | Kajimura | 250/234 |
| 5,210,410 | 5/1993 | Barrett | 250/234 |
| 5,229,606 | 7/1993 | Elings et al. | 250/307 |
| 5,266,801 | 11/1993 | Elings et al. | 250/306 |
| 5,267,471 | 12/1993 | Abraham et al. | 250/306 |
| 5,294,804 | 3/1994 | Kajimura | 250/561 |

FOREIGN PATENT DOCUMENTS 3-296612 12/1991 Japan .

Primary Examiner—David C. Nelms
Assistant Examiner—Stephone B. Allen
Attorney, Agent, or Firm—Frishauf, Holtz, Goodman & Woodward

[57] ABSTRACT

A cantilever has a probe on one surface of the free end and a reflection surface on the opposite surface thereof. A laser diode is located so as to emit a laser beam to the reflection surface at a predetermined angle. The cantilever is supported at a support member fixed to a cylindrical actuator for scanning the probe across the surface of a sample. Further, there is provided a photodiode having two portions for receiving the laser beam from the reflection surface of the cantilever to detect displacement of the probe on the basis of the incident position of the beam.

15 Claims, 8 Drawing Sheets

Rs: S-POLARIZED LIGHT
Rp: P-POLARIZED LIGHT $\varphi_c$: CRITICAL ANGLE

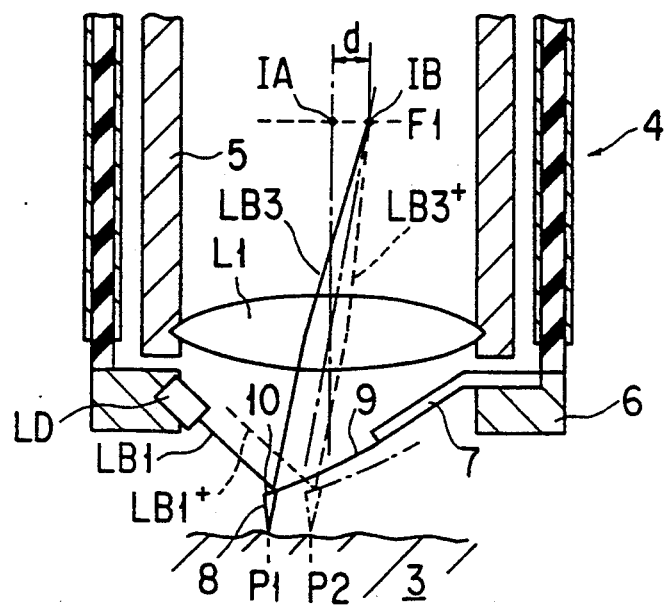
F I G. 7
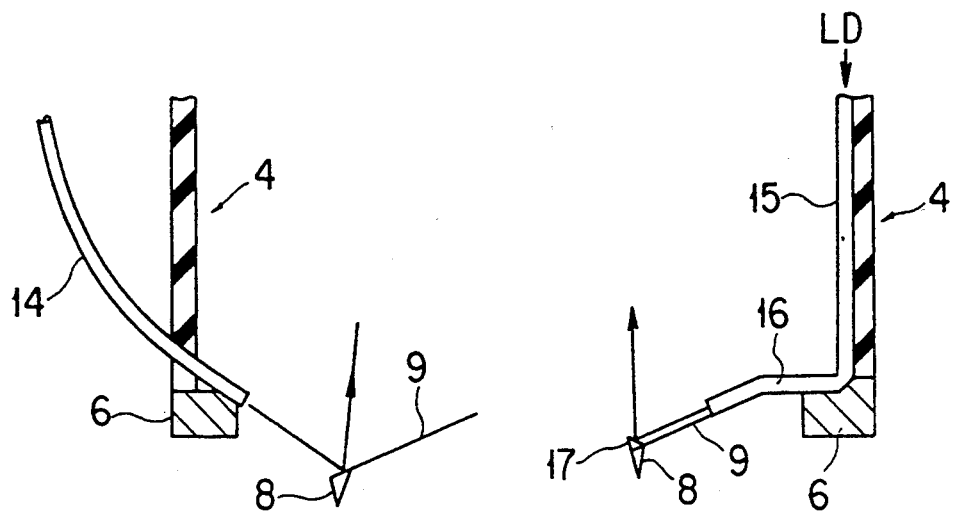
F I G. 8A    F I G. 8B

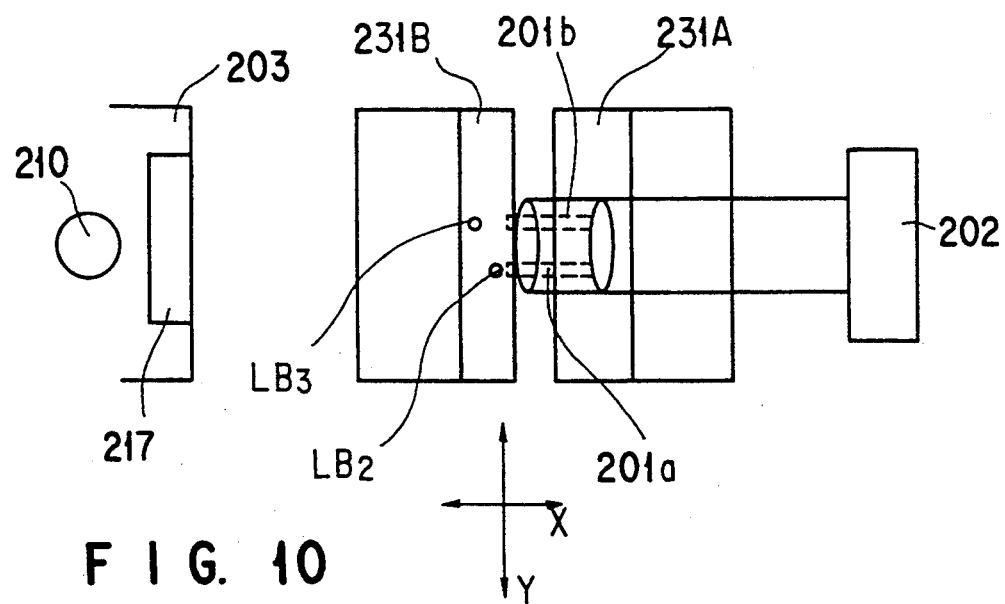
F I G. 10
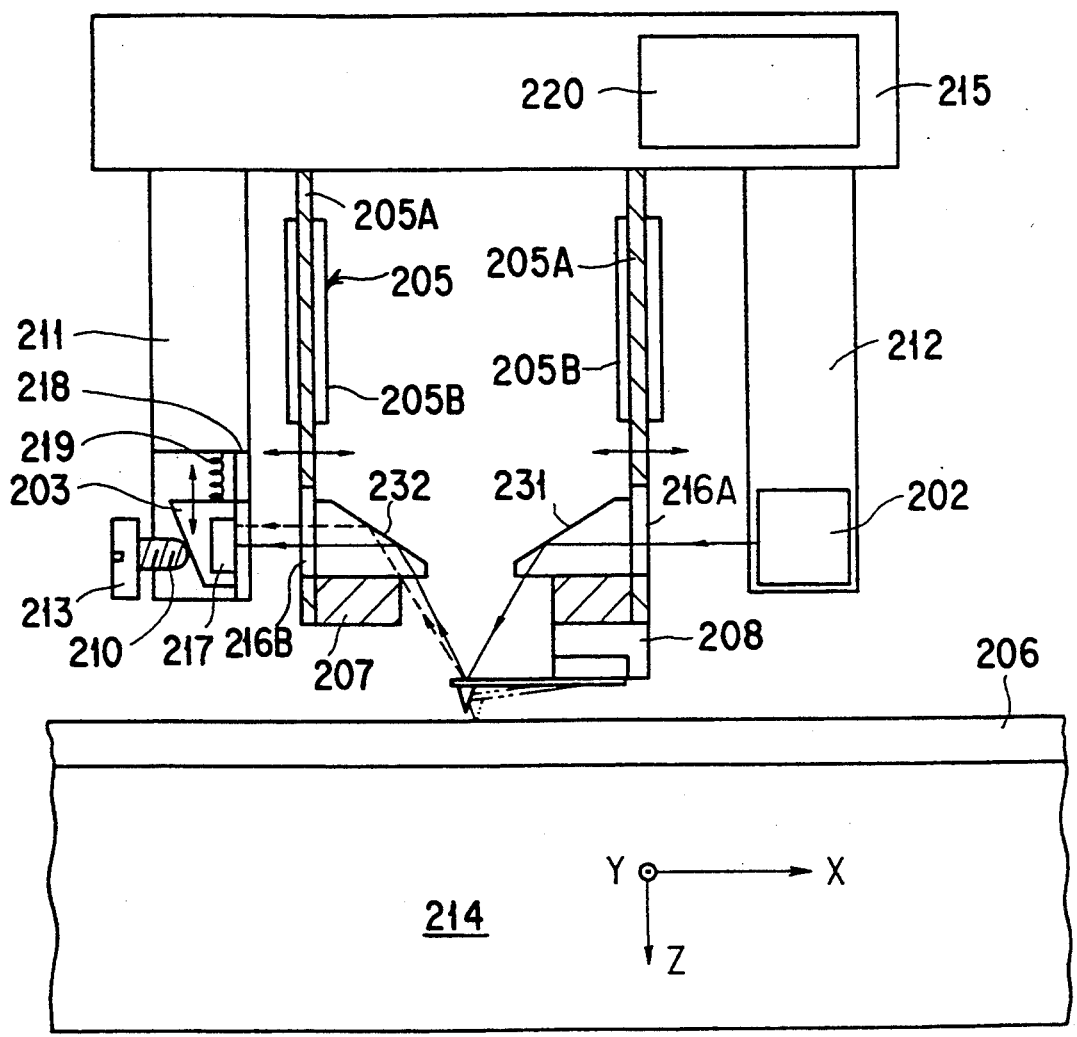
F I G. 11

ATOMIC FORCE MICROSCOPE WITH LIGHT BEAM EMISSION AT PREDETERMINED ANGLE

BACKGROUND OF THE INVENTION

A. Technical field of the Invention

This invention relates to an atomic force microscope for observing a surface of a sample with atomic order resolution.

B. Description of the Related Art

An atomic force microscope (AFM) includes a flexible cantilever having a probe on the free end, and is used to observe a surface of a sample with atomic order resolution by detecting variation of the displacement of the free end caused by an atomic force exerted between the probe and the sample, and scanning the probe across the surface of the sample with the variation kept constant.

In such AFM, an optical interference method, an optical focus detecting method and an optical lever method are some examples of a method for detecting displacement of the free end of the cantilever incorporated. In the case of the optical interference method, a laser beam is radiated onto a mirror provided on a surface of the free end, which is opposite to that on which the probe is fixed, and that variation in the intensity of the beam reflected therefrom which is due to displacement of the cantilever is detected by use of an interferometer. In the case of the optical focus detecting method, a detector is used to detect whether a beam projected thereon from the mirror surface of the cantilever via an optical element such as a critical angle prism, a cylindrical lens, or a knife edge is focused. In the case of the optical lever method, that variation in the incident angle of a laser beam with respect to the mirror of the cantilever, which is due to displacement thereof, is detected on the basis of the principle of optical lever. In this case, the variation in the incident angle of the laser beam is amplified and detected on the surface of a beam receiver.

A cantilever displacement detecting system used in the optical lever method will be explained with reference to FIG. 1. As is shown in FIG. 1, a cantilever 112 supported by a housing 110 has a free end with a probe 114 fixed on one surface thereof, and a mirror 116 on the other surface. A sample 118 placed on a sample table 120 is positioned opposed to the probe 114 in the vicinity thereof. The probe 114 is moved in X- and Y-directions, i.e., across the surface of the sample. The housing 110 houses a laser diode 122 for radiating a laser beam onto a mirror 116, and a light receiver 124 for receiving the beam reflected from the mirror 116. The receiver 124 has two light receiving regions 124a and 124b, and is located so that the center of the laser beam from the mirror 116 positions onto a boundary between the light receiving regions 124a and 124b when the cantilever 112 is in a reference position to be assumed at the time of measurement (i.e., in a horizontal position in FIG. 1). The light receiving regions 124a and 124b output voltage signals corresponding to the intensities of received light beam components, the inclination of the mirror 116 or the displacement of the cantilever 112 is obtained on the basis of measuring the difference between the intensities.

The detection sensitivity S in the optical lever method is given by $$S = D/\Delta = 2L/l$$

where D represents the amount of variation in the intensity of the beam on the light receiving surface of the light receiver 124, l represents the length of the cantilever 112 (generally 100–200 μm), L represents the length of the path of the beam reflected from the mirror 16 (i.e., the distance between the mirror 116 and the light receiver 124), and Δ represents the amount of displacement of the probe 114.

When L=100 mm and l=200 μm, $$S = 200/(200 \times 10^{-3}) = 10^3.$$

Thus, the optical lever method provides a highly sensitive displacement-detecting system with simple structure. The critical angle method provides a displacement detecting system with simple structure, too. In this method, a prism is located so that a laser beam directs onto its prism surface at a critical angle. The laser beam passes through the prism surface or is reflected to the interior of glass in response to a slight change of its incident angle. This means that the transmittance and the reflectance abruptly vary in accordance with variation in deflection angle. FIG. 2 shows a reflectance curve assumed when the refractive index n of glass is 1.5. Now, an observation optical system integrated AFM disclosed in U.S. application Ser. No. 07/511,054, in which the critical angle method is applied to the cantilever displacement system, will be explained with reference to FIG. 3.

A laser beam emitted from a laser diode 87 is collimated by means of a collimating lens 90, and enters into a polarized beam splitter 86. The laser beam reflected from the polarized beam splitter 86 is further reflected from a half mirror 85 and enters into a ¼ wavelength plate 84.

On the other hand, an illumination beam emitted from a light source 96 of the observation lighting apparatus is collimated by a lens 97 and reflected by a half mirror 92. The reflected illumination beam passes through a filter 91 and the half mirror 85, and enters into the ¼ wavelength plate 84.

The laser beam and illumination beam which have different principal rays enter into an objective lens 83 through the ¼ wavelength plate 84. The laser beam is transformed by the plate 84 from a linearly polarized beam to a circularly polarized beam, and is then converged by the objective lens 83 onto a cantilever 22 having a probe on its free end. The illumination beam is converged to a point in the vicinity of the probe to illuminate the overall visual field.

The illumination beam reflected from a sample 26 passes through the objective lens 83, ¼ wavelength plate 84, half mirror 85, filter 91, and half mirror 92, and is converged by an image forming lens 93 and enters into a prism 94. Part of the beam having entered into the prism 94 is reflected on its boundary face and reaches an ocular lens 95. The other part of the beam passes through the prism 94 and enters into a video camera 27 equipped with a CCD image element, etc., where it is converted to an image signal. This signal is supplied to a video monitor 28 and displayed thereon. The ¼ wavelength plate 84 is slightly inclined relative to the optical axis so that the reflected illumination beam will not directly enter into the observation optical system. Thus, a clear visual field observation image without flare is obtained.

The laser beam reflected on the upper surface of the cantilever 22 passes through the objective lens 83 and ¼ wavelength plate 84, reflects from half mirror 85, and is guided to the polarized beam splitter 86. The laser beam having passed through the ¼ wavelength plate 84 is converted to a linearly polarized beam whose oscillation phase is rotated by 90° relative to that of the beam before entering the same. The laser beam having entered the beam splitter 86 is divided into two beam components, one of which is radiated via a first critical angle prism 88a onto a first light receiving element 89a including two light receiving portions, and the other of which is radiated via a first critical angle prism 88b onto a second light receiving element 89b including two light receiving portions.

In the above structure, the critical angle method is used to detect the position of the cantilever. The principle of the method will be explained with reference to FIG. 4.

To effect this method, a critical angle prism c is located such that a critical angle is formed between a parallel light beam from a lens b and the reflecting surface a of the prism.

When the reflecting surface a is provided at the focus of the objective lens b (as indicated by solid line B), that is, when the beam can be converged on the surface a, the beam reflected therefrom is transformed by the lens b to a parallel beam, which enters into the critical angle prism c. In this case, the overall beam is reflected on the surface a, and the same amount of light is radiated onto each of the photodiodes of a light receiving element d.

On the other hand, when the reflecting surface a is provided at a location nearer to the lens b than the focus thereof (as indicated by broken line C), the beam reflected from the surface a and having passed through the lens b is a divergent beam, which enters into the critical angle prism c. Further, when the reflecting surface a is provided at a location farther from the lens b than the focus thereof (as indicated by broken line A), the beam having passed through the lens b is a converged beam, which enters into the critical angle prism c. In both cases, a non-parallel beam enters into the prism c. Since only a mid portion of the beam enters into the prism at the critical angle, and the incident angle of the part of the beam positioned on one side from the mid portion is smaller than the critical angle, that part of the beam is radiated partially to the outside of the prism c. Moreover, since the incident angle of the part of the beam positioned on the other side from the mid portion is larger than the critical angle, that part of the beam is overall reflected from the prism c. As a result, the amount of light received by one photodiode of the light receiving element d differs from that received by the other photodiode, and a signal indicative of the difference between the light amounts is output from an output terminal f via a differential amplifier e. This means that the position of the reflecting surface a is detected on the basis of the difference in the light amounts of the detection surfaces of the element d.

As described above, since the beam having entered into the critical angle prism at an incident angle smaller than the critical angle is radiated partially to the outside thereof whenever it is reflected from the reflecting surface, the amount of the refractive component of the beam is greatly reduced. Thus, the difference in the amount of light having entered at an angle smaller than the critical angle and that of light having entered at an angle larger than the same is greatly increased. To enhance the accuracy of measurement, the beam preferably reflects several times in the critical angle prism. In this system, the detection light is reflected twice in the prism. As is shown in FIG. 5, the output of a photodiode PD1 of the first light receiving element is input to the inverted input terminal of a comparator 102, while the output of a photodiode PD2 is input to the non-inverted input terminal of the comparator 102. The comparator 102 outputs the difference between the outputs of the photodiodes PD1 and PD2. On the other hand, the output of a photodiode PD3 of the second light receiving element is input to the inverted input terminal of a comparator 104, and the output of a photodiode PD4 is input to the non-inverted input terminal of the comparator 104. The comparator 104 outputs the difference between the outputs of the photodiodes PD3 and PD4. The outputs of the comparators 102 and 104 are added, and the addition value is input to one terminal of a comparator 106, where the addition value is compared with a reference value, and the comparison result is output. Thus, a signal is output from a terminal 108, which indicates the difference between the amounts of light received in two regions which are defined by the center line of the spot of a beam radiated onto the light receiving element, i.e., which indicates the position of the cantilever 22.

In the above system, the sample 26 is placed on an xyz driving apparatus 24 (e.g. a cylindrical actuator), and is raster-scanned in an xy plane at 10–100 cycles. A signal directly obtained during the raster scanning and indicative of the displacement of the cantilever, or a servo signal obtained when servo control is performed in the z-direction so as to keep the displacement of the cantilever constant, is processed in synchronism with the scanning signal so as to obtain an AFM image.

However, since a cantilever displacement detecting system which employs the above-described interference method, optical lever method, or focus detecting method is inevitably large and heavy, the raster scanning between the probe and sample is performed generally by placing on an actuator a sample such as a several mm-square HOPG chip, Si chip, or semiconductor chip, and moving the sample together with the actuator. The range which can be observed by thin scanning is as extremely narrow as 10–20 $\mu m^2$.

However, it has been necessary to measure a component such as an 8-inch wafer, for example, in the case of measuring the configurations of the surface at nm-order, or in the case of observing the structure of a semiconductor during process. Enlarging the stage on which a sample is placed and increasing its rigidity so as to satisfy the necessity inevitably increases its weight. This is disadvantageous to perform raster scanning by moving a large sample, since a great force of inertia exerts during moving it together with a heavy stage, and hence control of the movement of the sample and stage is extremely difficult.

SUMMARY OF THE INVENTION

It is an object of the invention to provide an atomic force microscope capable of observing a large sample.

It is another object of the invention to provide an atomic force microscope capable of scanning at high speed.

A further object of the invention will be clarified from explanations made hereinbelow with reference to the accompanying drawings.

The invention provides an atomic force microscope for observing a sample by use of an atomic force exerting between atoms of a tip of a probe and a surface of the sample, comprising:

a cantilever having a stationary end and a free end, which comprises the probe on one surface of the free end and a reflecting surface on an opposite surface of the free end;

beam emission means for emitting a light beam to the reflecting surface of the cantilever at a predetermined angle;

scanning means for scanning the probe across the surface of the sample;

displacement detecting means for receiving the light beam from the reflecting surface of the cantilever to detect displacement of the probe; and means for forming an image on the basis of signals output from the scanning means and the displacement detecting means.

BRIEF DESCRIPTION OF THE DRAWINGS

The accompanying drawings constitute part of the present application, and will be useful for understanding the principle of the present invention, together with explanations made hereinbelow as regards embodiments thereof.

FIG. 7 shows the optical path of a laser beam, assumed when a cantilever shown in FIG. 6 is displaced;

FIGS. 8A and 8B show modifications of a displacement detecting system employed in the atomic force microscope shown in FIG. 6, respectively;

FIG. 10 shows the relationship in position between optical elements shown in FIG. 9, obtained when they are viewed from the above;

FIG. 11 shows an atomic force microscope according to a third embodiment of the invention.

DETAILED DESCRIPTION OF THE PREFERRED EMBODIMENTS

A first embodiment of the invention, which is a cantilever displacement detecting system employed in an atomic force microscope, will not be explained with reference to the drawings.

Figure 1:
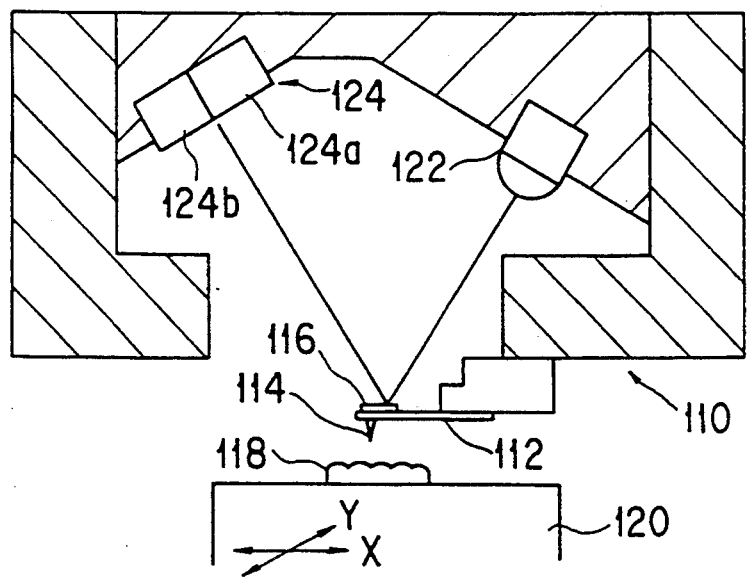
FIG. 1 shows a cantilever displacement detecting system employing an optical lever method.
Figure 2:
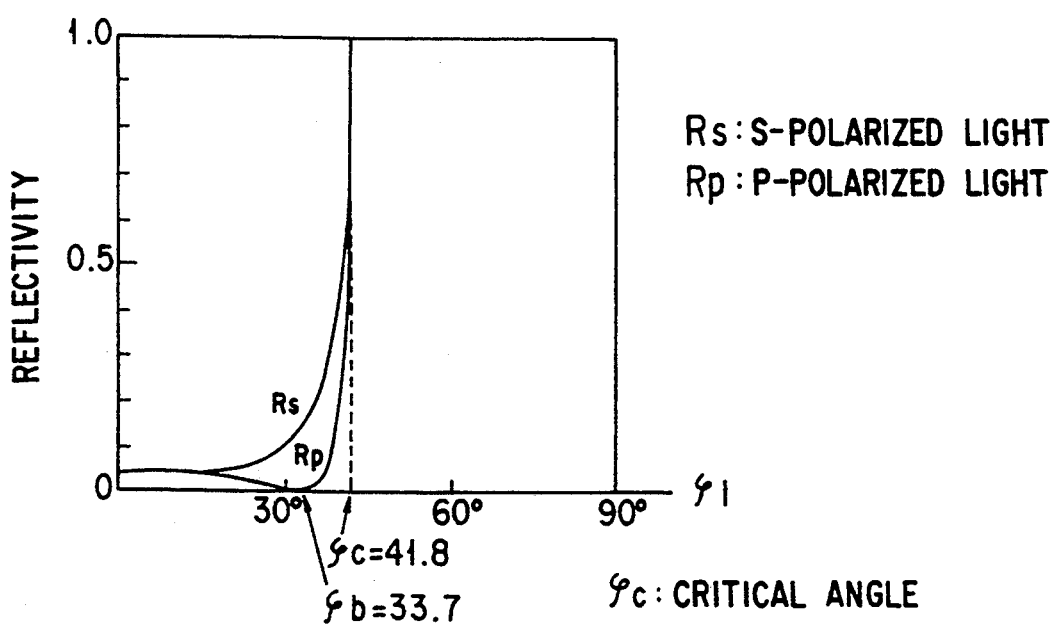
FIG. 2 shows reflectance curves of a glass member.
Figure 3:
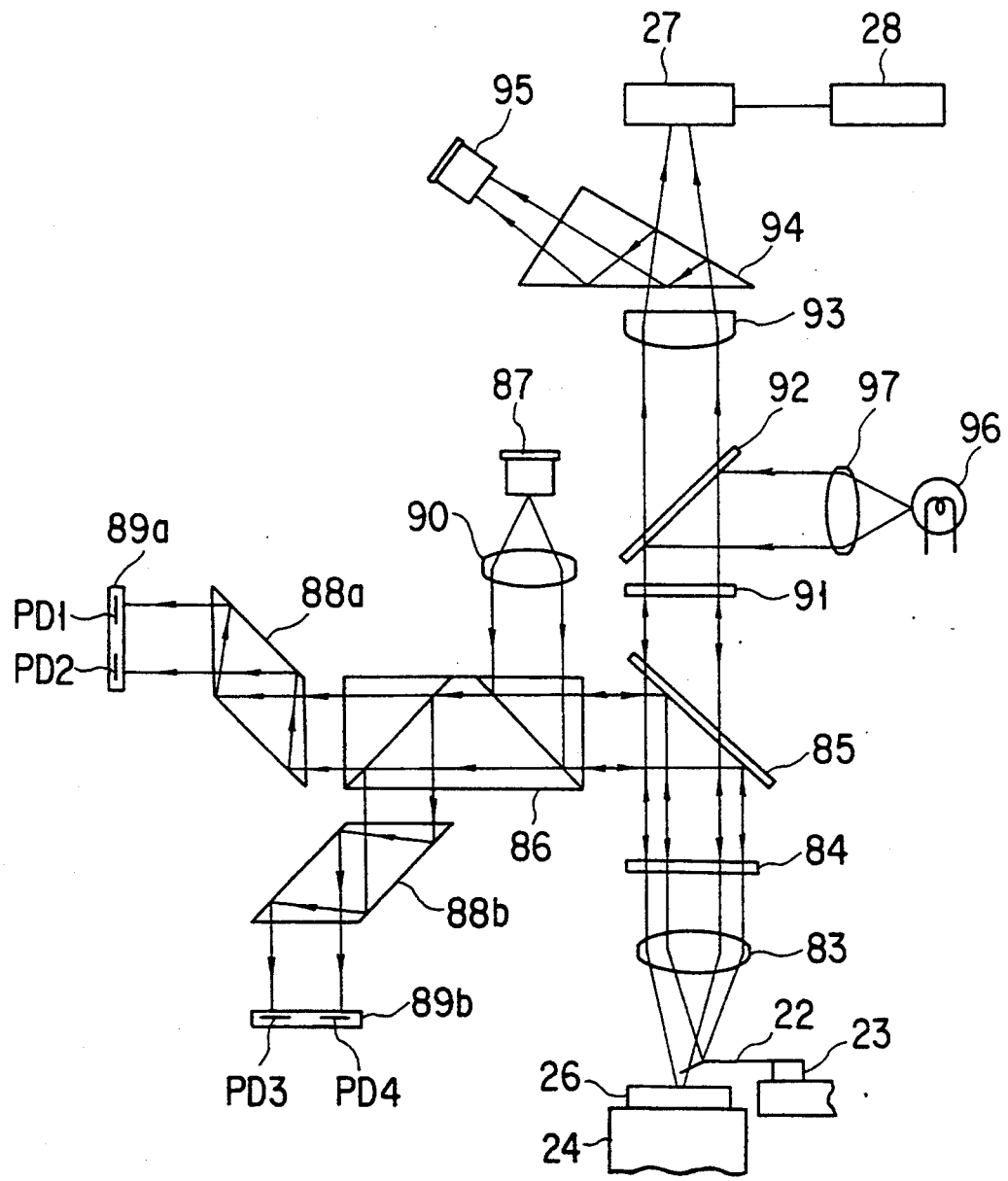
FIG. 3 shows a conventional observation optical system integrated AFM.
Figure 4:
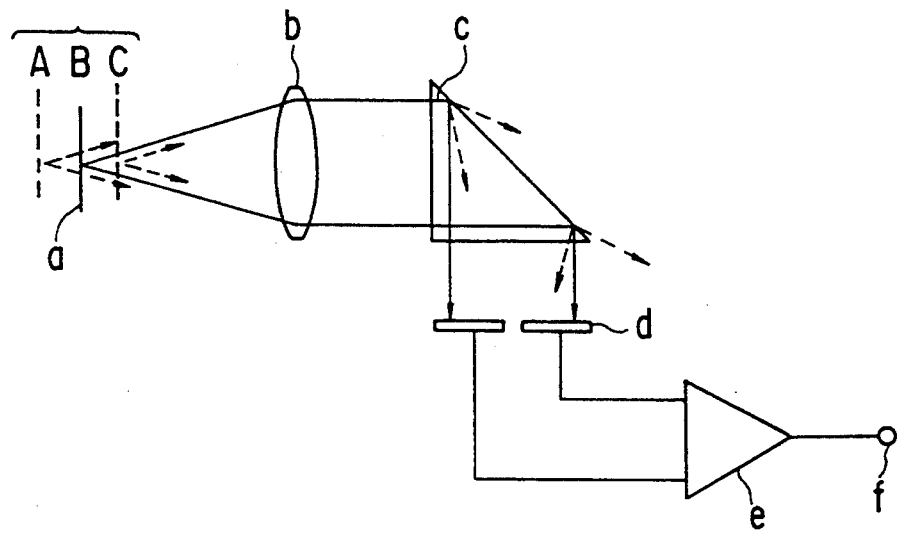
FIG. 4 is a view, useful in explaining the principle of a critical angle method.
Figure 5:
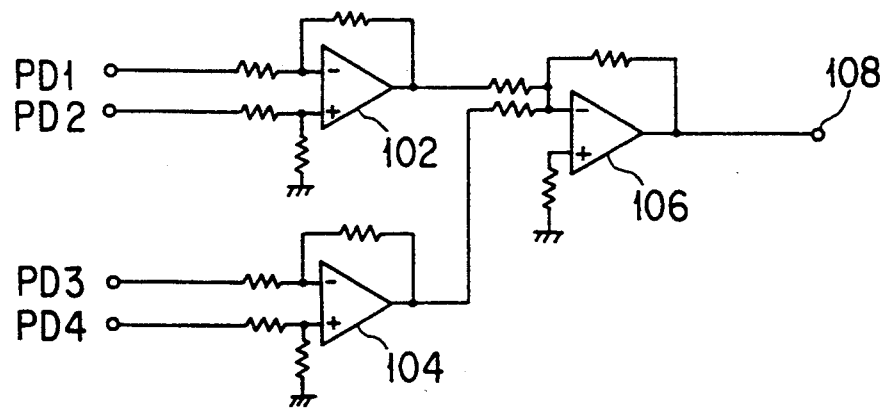
FIG. 5 shows a circuit connected to a photodiode shown in FIG. 3.
Figure 6:
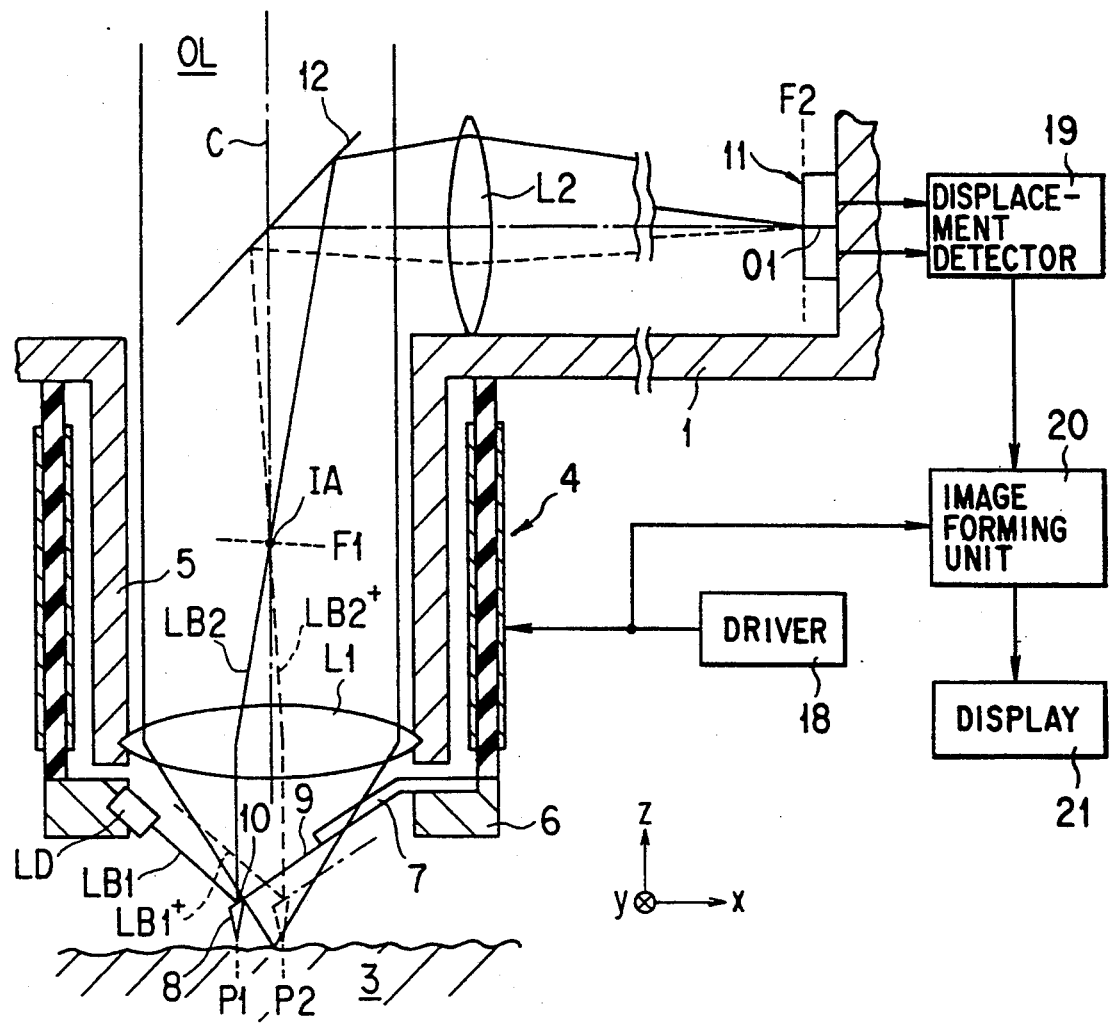
FIG. 6 shows an atomic force microscope according to a first embodiment of the invention.

As is shown in FIG. 6, the cantilever displacement detecting system has an objective lens L1 for optically observing a sample 3. The lens L1 is fixed to the lower end of a binocular tube 5 attached to a body 1. A sample observation light beam OL from the sample 3 enters into an optical image forming system (not shown) via the objective lens L1. Thus, the surface of the sample is optically observed.

A cylindrical actuator 4 is provided around the binocular tube 5 supporting the lens L1, and is supported by the body 1. The actuator 4 has a free end which is movable in three-dimensional (XYZ) directions in accordance with an input from a driver 18. The free end is provided with a disk 6 having a circular opening. A laser diode LD and a support member 7 for a cantilever 9 extend from the disk 6 toward a central portion of the opening such that they are opposed to each other. The cantilever 9 has a probe 8 on the lower surface of its free end, and a reflecting mirror 10 on the upper surface of the same. The laser diode LD is located such that a beam LB1 to be emitted therefrom directs to the reflecting mirror 10 at a predetermined angle. Further, the cantilever 9 is inclined at such an angle as to make a laser beam LB2 reflected from the mirror 10 be parallel with an optical axis C when no interatomic force exerts between a tip end of the probe and the surface of the sample, as is shown in FIG. 6.

A half mirror 12 is provided above the objective lens L1, for reflecting the laser beam from the mirror 10 of the cantilever 9 to a lens L2 located on its right side. A photodiode 11, which has two light receiving regions, is provided on the right side of the lens L2. Although the photodiode 11 may be located in the rear focal plane F1 of the objective lens L1, in this embodiment it is secured to the body 1 in the rear focal plane F2 of the lens L2 so as not to shade the observation light beam OL. Here, the focal plane F1 is relayed by the lens L2 to the conjugate focal plane F2. The photodiode 11 has two light receiving portions adjacent to each other, and is located such that the laser beam is radiated onto a boundary O1 between the two light receiving portions when no atomic force exerts between a tip end of the probe and the surface of the sample, as is shown in FIG. 6.

Then, an explanation will be given, with reference to FIGS. 6 and 7, of the fact that the incident position of the laser beam on the photodiode 11 varies depending only upon the Z-directional position of the probe 8, not upon the x- or Y-directional position thereof. FIG. 6 shows two positions of the probe 8 assumed when no atomic force exerts. FIG. 7 shows two positions of the probe 8, which are displaced by the same distance in the Z-direction from the positions shown in FIG. 6, respectively, due to atomic forces exerted.

As is shown in FIG. 6, when the probe 8 is positioned at a point P1 on the sample, the laser beam LB2 reflected from the mirror 10 of the cantilever 9 enters into the objective lens L1 in parallel with the optical axis C. The laser beam LB2 refracted by the lens L1 passes a focus IA thereof, reflects on the half mirror 12, passes through the lens L2, and reaches the boundary O1 of the photodiode 11.

Further, no atomic force exerts between the tip end of the probe 8 and the surface of the sample also when the probe 8 is positioned at a point P2, so that the direction the mirror 10 of the cantilever 9 faces at the point P2 is identical to that at the point P1. Thus, a laser beam LB1+ emitted from the laser diode LD enters into the objective lens L1 in parallel with the laser beam LB1, i.e., with the optical axis C. Accordingly, a laser beam LB2+ passes the focus IA, reflects on the half mirror 12, passes through the lens L2, and reaches the same incident position of the beam LB2, i.e., the boundary O1 of the photodiode 11.

FIG. 7 shows a state in which the probe 8 is moved upward by a distance A as a result of an atomic force exerted. Both a laser beam LB3 reflected by the mirror 10 of the cantilever 9 when the probe 8 is at the point P1, and a laser beam LB3+ reflected by the mirror 10 when the probe 8 is at the point P2, enter into the objective lens L1 at an angle of a to the optical axis C. Since the laser beams LB3 and LB3+ are parallel with each other, they pass the same point IB on the rear focal plane F1. Accordingly, these beams reach that single point on the photodiode 11 which is not contained in the boundary O1. Assuming that the distance between the optical axis (point IA) and the point IB is d, and the magnification of the lens L2 is M, the center of the laser beam LB3 or LB3+ reaches a point apart from the boundary O1 by Md.

As can be understood from the above, the laser beam directs the same point of the photodiode 11 irrespective of the X- or Y-directional position of the probe 8, the probe 8 is at the same Z-directional position i.e., the amount of displacement of the cantilever 9 is at the same. Thus, the difference between the outputs of the two light receiving portions varies in accordance with the Z-directional position of the probe 8. The difference is calculated by a displacement dictator 10 comprising such as a comparator, and is output therefrom as a displacement signal. This signal is input to an image forming unit 20, which in turn processes the signal in synchronism with an xy scanning signal output from the driver 19 during scanning the probe 8, so as to form an image of the sample 3. This image data is output to a display 21 and displayed thereon.

When the objective lens L1 has an effective visual field of 2 mm$\phi$, the probe 8 can perform AFM measurement within as a wide range as of 1–1.5 mm$^2$.

Although in the above embodiment, the laser diode is arranged such that the laser beam therefrom can be radiated directly onto the reflecting mirror provided on the cantilever, it may be separated from the scanning unit and the laser beam be guided to the mirror via an optical fiber or an optical waveguide. FIG. 8A shows a modification of the embodiment, which employs an optical fiber, while FIG. 8B shows a modification which employs an optical waveguide. In the case shown in FIG. 8A, an optical fiber 14 is attached to the disk 6 such that it can emit a laser beam from its light output end onto the reflecting mirror 10 of the cantilever 9 so as not to interrupt scanning. The light input end of the fiber 14 is connected to a light source separated from the scanning unit. On the other hand, in the case shown in FIG. 8B, an optical waveguide 15 is formed on the cylindrical actuator 4. Further, the support member 7 of the cantilever 9 consists of an optical waveguide 16. This waveguide 16 is optically connected to the waveguide 15 for guiding light from the laser diode LD. A deflection element 17 consisting of a prism or a Fresnel lens is provided at the free end of the cantilever 9, for deflecting the laser beam emitted from the optical waveguide 16, in a predetermined direction. Moreover, the photodiode 11 may be replaced with a position sensor (PSD).

Figure 9:
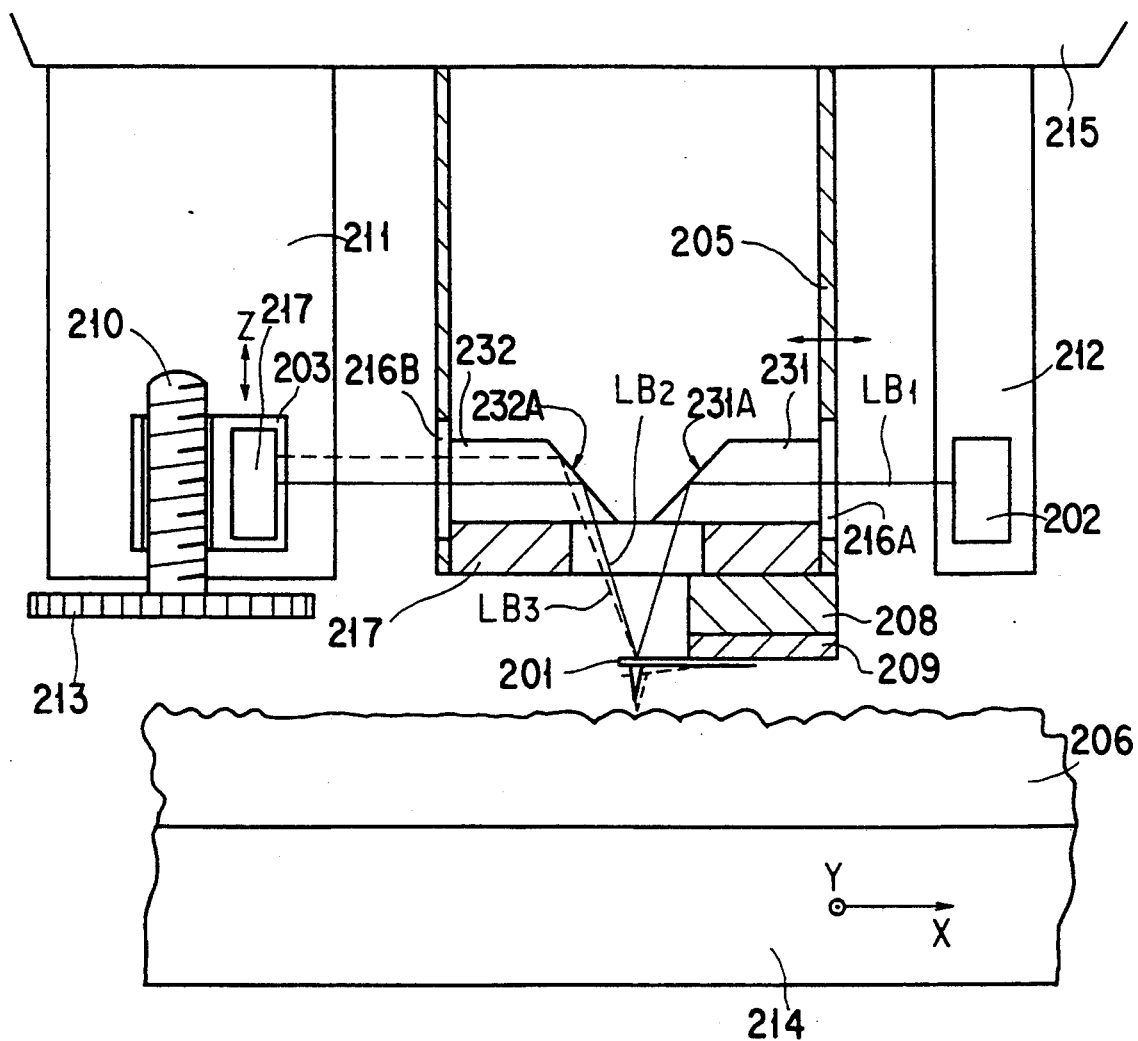
FIG. 9 shows an atomic force microscope according to a second embodiment of the invention.

A cantilever displacement detecting system according to a second embodiment of the invention will be explained with reference to FIGS. 9 and 10. As is shown in FIG. 9, an upper holding body 215 is held by a main body (not shown), and holds an LD support member 212 supporting a laser source (LD) 202, a fine movement element (cylindrical actuator) 205 supporting a cantilever 201 for scanning, and a PD support member 211 supporting an optical detection element 203 including a position sensor (PSD) 217. The laser source 202 is attached to the LD support member 211 such that it can emit a laser beam in a horizontal direction. The optical detection element 203 is movable in the PD support member 211 in the Z-direction, through a fine movement screw 210 by rotating a knob 213. A ring member 207 made of iron or the like is attached to a lower portion of the fine movement element 205. The cantilever 201 has a free end provided with a probe, and a stationary end fixed to a support member 209 made of iron. The support member 209 is secured to a lower portion of the ring member 207 by the magnetic force of a magnet 208 interposed therebetween. Thus, the cantilever 201 is supported by a lower portion of the ring member 207. Windows 216A and 216B are formed in those lower portions of the fine movement element 205 which are opposed to the laser source 202 and optical detection element 203. Prisms 231 and 232 are provided on the support member 207 in the fine movement element 205 such that they face the windows 216A and 216B, respectively. The prism 231 has a mirror surface 231A for reflecting a laser beam emitted from the laser source 202, to the free end of the cantilever 201, while the prism 232 has a mirror surface 232A for reflecting a laser beam reflected from the free end of the cantilever 201, to the optical detection element 203. An XY stage 214 for rough movement is provided at a lower portion of a main body (not 10 shown). A sample 206 is placed on the stage 214. Since the stage 214 can widely move the sample 206, the portion of the sample to be observed can be moved to a position under the cantilever 201 even if the sample is large.

The laser beam LB1 emitted from the laser source 202 enters into the prism 231 through the window 216A, reflects on the mirror surface 231A, and reaches the free end of the cantilever 201. The reflection beam LB2 from the free end enters into the prism 232, reflects on the mirror surface 232A, and enters into the position sensor 217 of the optical detection element 203 through the window 216B. The position of the element 203 is preadjusted so that the reflection beam LB2 can enter into an appropriate portion of the position sensor 217 when the cantilever 201 is in a predetermined state, for example, when it is positioned horizontal. When the free end of the cantilever 201 is moved as indicated by a broken line, the incident position of the reflection beam LB3 (indicated by a broken line) on the position sensor 217 is moved upward, and the sensor 217 outputs a signal indicative of the movement of the free end of the cantilever 201.

As is shown in FIG. 10, the laser source 202 emits a laser beam having an elliptical cross section whose major shaft extends in the Y-direction. This being so, the laser beam LB1 can reliably be radiated onto the free end of the cantilever 201 even when the cantilever 201 is scanned in the Y-direction by the fine movement element 205. Since the laser source 202 emits horizontally (i.e., in parallel with the X-direction) a beam having an elliptical cross section in major axis extends in the Y-direction, the free end of the cantilever 201 always receives the laser beam LB1 which is in the same state, irrespective of its X- or Y-directional position, when the fine movement element 205 scans the cantilever 201 in the X- and Y-directions. The movement of the free end is detected as the vertical movement of the incident position of the reflection beam on the position sensor 217. In FIG. 10, reference numeral 201a denotes the cantilever which is in the state indicated by the solid line in FIG. 9, and reference numeral 201b the cantilever which is in the state indicated by the broken line in FIG. 9. This indicates that the respective incident positions of the reflection beams LB2 and LB3 on the mirror surface 232A depend on variation in the state of the cantilever.

As described above, since in the AFM of this embodiment, the laser source 202 and the optical detection element 203 are respectively supported by the support members 212 and 211 not by the fine movement element 205, a relatively light load is applied to the element 205. Thus, the cantilever 201 is scanned at relatively high speed.

Then, a cantilever displacement detecting system according to a third embodiment of the invention will be explained with reference to FIG. 11. In FIG. 11, elements similar to those of the second embodiment are denoted by corresponding reference numerals, and explanation thereof is omitted. In this embodiment, the fine movement element 205 comprises a parallel spring 205A and a bimorph 205B. The parallel spring 205A has an upper end secured to the upper holding body 215, and a lower end which can be moved by the bimorph 205B in the X-direction. As in the second embodiment, the windows 216A and 216B are formed in lower portions of the parallel spring 205A, and the prisms 231 and 232 and ring member 207 are attached to lower portions of the fine movement element 205. The cantilever 201 is secured to the ring member 207 by the magnet 208. The optical detection element 203 is urged downward by a spring 219, and also urged against a slide surface 218 by a fine movement screw 210. The fine movement screw 210 contacts with the inclined surface of the optical detection element 203, which is moved in the Z-direction by rotating the knob 213. The PD support member 211 supporting the optical detection element 203 and the LD support member 212 supporting the laser source 202 are secured to the upper holding body 215, together with the fine movement element 205. The upper holding body 215 is movable in the Y-direction with respect to the main body (not shown), and is scanned in the Y-direction by a driving element 220. Accordingly, the cantilever 201 is scanned in the X-direction by the fine movement element 205, and also in the Y-direction by the driving element 220.

Since in this embodiment, the fine movement element 205 comprises the parallel spring 205A and bimorph 205B, it is made compact and light, and be moved linearly over a wide range in the x-direction.

Although, in the embodiment, the part to be moved in Y-directional scanning is not compact or light, it is not any problem for intending to achieve high speed scan by means of minimizing the part to be moved during the scan, since the Y-directional scanning is performed actually at low speed.

Figure 12:
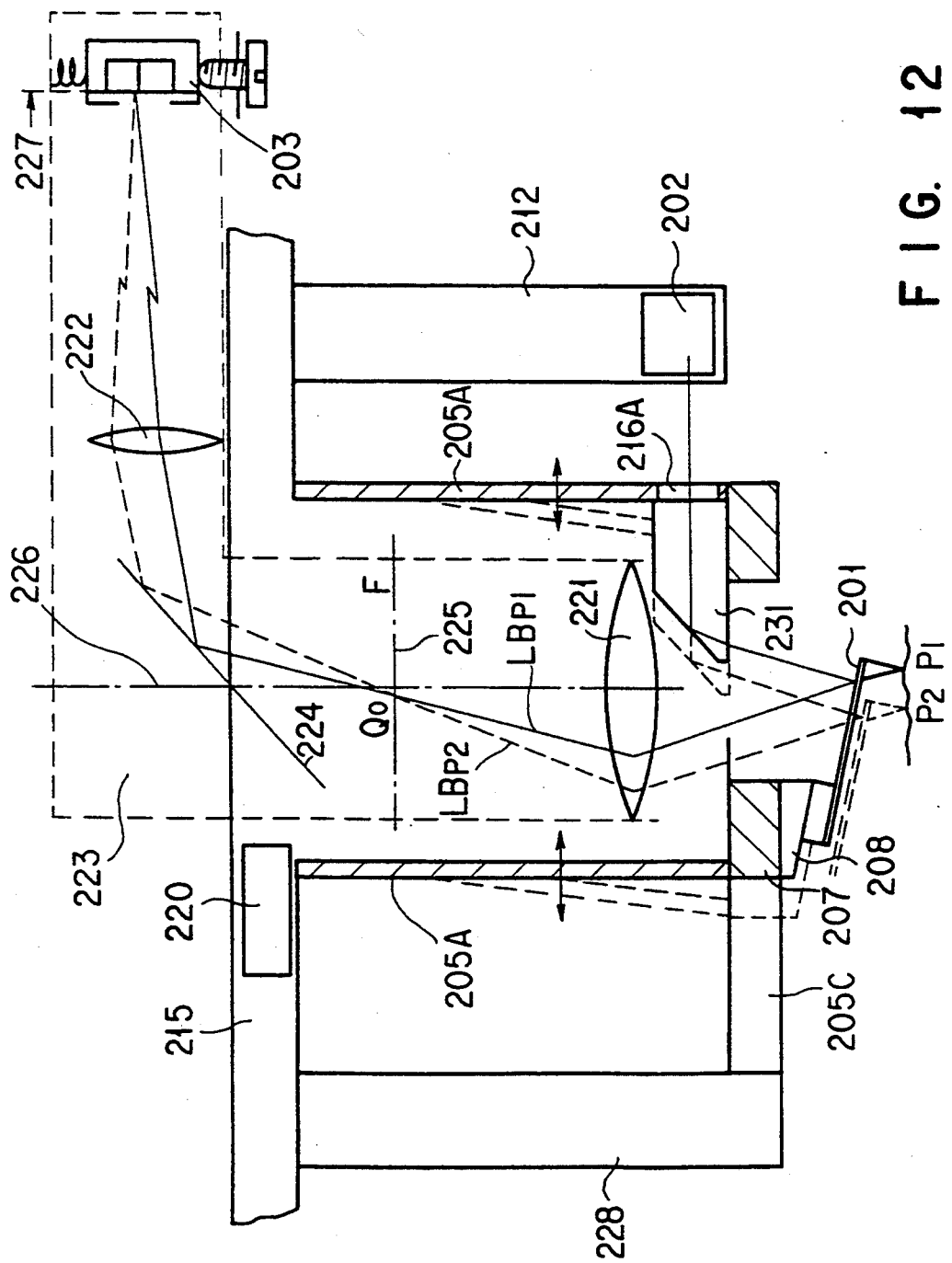
FIG. 12 shows an atomic force microscope according to a fourth embodiment of the invention.

Lastly, a cantilever displacement detecting system according to a fourth embodiment will be explained with reference to FIG. 12. In the fourth embodiment, the upper holding body 215 is movable in the Y-direction with respect to the main body (not shown), and be scanned in the Y-direction by the driving element 220, as in the third embodiment. The holding body 215 holds the LD support member 212 supporting the laser source 202, a support member 228 corresponding to the above described PD support member, and the parallel spring 205A extending downward. As in the third embodiment, the window 216A is formed in a lower portion of the parallel spring 205A, and the prism 231 and ring member 207 are provided. The cantilever 201 is secured to the ring member 207 by the magnetic force of the magnet 208. The lower end of the support member 228 is connected to the ring member 207 by a lamination-type piezoelectric element 205C. The element 205C and parallel spring 205A form a fine movement element, and the cantilever 201 is scanned in the X-direction by contraction/expansion operation of the element 205C. A lens 221 is located in the parallel springs 205A, independent from the fine movement element. A mirror 224 is provided above the lens 221, and a lens 222 on the right side of the mirror 224. The optical detection element 203 is located in a conjugate plane 227, at which the rear focal plane 225 of the lens 221 is projected by the lens 222.

The laser beam emitted from the laser source 202 is reflected by the prism 231, radiated onto the free end of the cantilever 201, deflected by the lens 221, and reflected by the mirror 224, and enters into the optical detection element 203 through the lens 222. In an optical system 223 from the lens 221 to the optical detection element 203, reflection beams LBp1 and LBp2 from the cantilever 201 which is at the X-directional positions p1 and p2 are parallel with each other until the lens 221 when the cantilever 201 is not displaced in the z-direction, so that they are converged onto a single point (Q0) on the rear focal plane 225 of the lens 221 after passing therethrough. Even when the cantilever 201 is displaced in the Z-direction by an atomic force when the displacement is at the same, the laser beam passes through the same point on the rear focal plane 225 irrespective of the XY position of the cantilever 201 during scanning. Although the optical detection element 203 may be located on the rear focal plane 225 of the lens 221, in this embodiment it is located in the conjugate plane 227 at which the rear focal plane 225 of the lens 221 is projected by the lens 222, and an image forming optical system is provided above the mirror 224, such that an optical image of the sample 206 is obtained in use of the lens 221 through the mirror 224.

Since in the fourth embodiment, the part to be moved by the fine movement element is made smaller and lighter than that of the second or third embodiment, the fine movement element receives a lighter load. Further, since the optical detection element 203 is separated from the upper holding body 215, the driving member 220 receives a light Y-directional load.

It is a matter of course that the invention is not limited to the above-described embodiments, but can be modified or improved without departing from the scope thereof.

What is claimed is:

1. An atomic force microscope for scanning a probe across a surface of a sample, to measure physical characteristics of the sample on the basis of an atomic force exerted between atoms of a tip of the probe and the surface of the sample, comprising:
   a cantilever having a stationary end and a free end, which comprises the probe on one surface of the free end and which has a reflecting surface on an opposite surface of the free end;
   scanning means for scanning the probe across the surface of the sample, the scanning means including an actuator having a stationary end and a free end which is movable, the stationary end of the cantilever being secured to the free end of the actuator;
   beam emission means for emitting a light beam, the beam emission means including beam direction means mounted on the free end of the actuator which directs the light beam to the reflecting surface of the cantilever at a predetermined angle;

displacement detecting means for receiving the light beam from the reflecting surface of the cantilever to detect displacement of the probe; and means for forming an image on the basis of signals output from the scanning means and the displacement detecting means.

2. The atomic force microscope according to claim 1, wherein:

the beam emission means comprises a light source for emitting the light beam, the light source being secured to the free end of the actuator.

3. The atomic force microscope according to claim 1, wherein:

the beam emission means comprises a light source for emitting lights and light transmission means for transmitting the lights;

the light transmission means having an input end through which the lights enter into the light transmission means, and an output end which applies the lights as the light beam, the output end being secured to the free end of the actuator.

4. The atomic force microscope according to claim 3, wherein the light transmission means includes an optical fiber.

5. The atomic force microscope according to claim 3, wherein the light transmission means includes an optical waveguide.

6. The atomic force microscope according to claim 5, wherein the optical waveguide comprises the output end which applies the light beam in parallel with the cantilever, and the reflecting surface is mounted at a predetermined angle on the one surface of the free end of the cantilever.

7. The atomic force microscope according to claim 1, wherein the beam emission means comprises a light source for emitting the light beam, and deflecting means for deflecting the light beam from the light source to the reflecting surface of the cantilever.

8. The atomic force microscope according to claim 7, wherein:

the deflecting means comprises a prism provided at the free end of the actuator.

9. The atomic force microscope according to claim 1, wherein the displacement detecting means comprises:

a light receiving element having at least two light receiving regions each for receiving the light beam and for outputting a signal indicative of an intensity of the received light beam; and reflected beam deflecting means for deflecting the light beam reflected from the reflecting surface of the cantilever toward the light receiving element.

10. The atomic force microscope according to claim 9, wherein:

the reflected beam deflecting means comprises a prism provided at the free end of the actuator.

11. The atomic force microscope according to claim 8, wherein the displacement detecting means comprises:

a light receiving element having at least two light receiving regions each for receiving of the intensity of the received light beam; and reflected beam deflecting means for deflecting the light beam reflected from the reflecting surface of the cantilever toward the light receiving element.

12. The atomic force microscope according to claim 11, wherein:

the deflecting means comprises a prism provided at the free end of the actuator; and the reflected beam deflecting means comprises another prism provided at the free end of the actuator.

13. The atomic force microscope according to claim 9, further comprising an objective lens for optically observing the sample; and wherein:

the reflected beam deflecting means comprises reflecting means for reflecting the light beam which has passed through the objective lens;

the displacement detecting means comprises a relay lens, provided in a position which the light beam reflected from the reflecting means passes, for relaying an image formed by the objective lens; and the light receiving element is located in a plane conjugate with the rear focal plane of the objective lens.

14. The atomic force microscope according to claim 2, further comprising an objective lens for optically observing the sample; and wherein the displacement detecting means comprises a light receiving element having at least two light receiving regions each for receiving the light beam and for outputting a signal indicative of an intensity of the received light beam, reflecting means for reflecting the light beam which has passed through the objective lens after being reflected from the reflecting surface of the cantilever, and a relay lens, located in a position which the light beam reflected from the reflecting means passes, for relaying a image formed by the objective lens; and the light receiving element is located in a plane conjugate with the rear focal plane of the objective lens.

15. The atomic force microscope according to claim 11, further comprising an objective lens for optically observing the sample; and wherein:

the deflecting means comprises a prism provided at the free end of the actuator;

the reflected beam deflecting means comprises reflecting means for reflecting the light beam which has passed through the objective lens;

the displacement detecting means comprises a relay lens, provided in a position which the light beam reflected from the reflecting means passes, for relaying an image formed by the objective lens; and the light receiving element is located in a plane conjugate with the rear focal plane of the objective lens.

* * * * *